United States Patent [19]

Trasen et al.

[11] 3,730,353
[45] May 1, 1973

[54] FILTER SUPPORT AND FILTER UNIT CONSTRUCTION

[75] Inventors: Ben Trasen, Wellesley; Donald B. Rising, Stow, both of Mass.

[73] Assignee: Millipore Corporation, Bedford, Mass.

[22] Filed: Dec. 28, 1970

[21] Appl. No.: 101,850

[52] U.S. Cl. ................... 210/455, 210/461, 210/486
[51] Int. Cl. .............................................. B01d 35/02
[58] Field of Search .................... 210/321, 455, 74, 210/434, 486, 461, 346

[56] References Cited

UNITED STATES PATENTS 3,019,904   2/1962   Stecher ........................... 210/346 X
3,263,819   8/1966   Schmidt et al. ....................... 210/486
3,522,885   8/1970   Lavender et al. ..................... 210/321

*Primary Examiner*—Frank A. Spear, Jr.
*Attorney*—Clarence S. Lyon, Esq.

[57] ABSTRACT

A filter support with two opposing surfaces having perforations in the central portion and a flat surface surrounding the central portion. The perforations permit passage of fluid between the support surfaces. An inlet and outlet means are attached to the peripheral surface of the holder and the outlet is in fluid communication with the perforations in both support surfaces. A filter unit is formed by sealing a cover and a filter membrane to each flat surface.

3 Claims, 8 Drawing Figures

PATENTED MAY 1 1973

INVENTORS
BEN TRASEN
DONALD B. RISING
BY
Kenway, Jenney & Hildreth
ATTORNEYS

INVENTORS
BEN TRASEN
DONALD B. RISING

FILTER SUPPORT AND FILTER UNIT CONSTRUCTION

This invention relates to a filter support and a filter unit utilizing the filter support and filters.

Presently, there are available sealed sterilized filter units comprising a filter support, a filter and a cover to seal the filter and filter support from the atmosphere and to separate the upstream material from the downstream material. These filter units are useful only in limited circumstances since their capacity is limited by their construction wherein only one filter surface is available for use. When used, for example, in intravenous solution preparation, the unit diameter would have to be enlarged to the point where the advantages accruing with unit compactness would be lost. Thus, there is a present need for a high capacity, compact, sterilized filter unit.

The present invention provides a novel filter support, a filter construction employing the support and a method for making the same. The filter support comprises a plate-like structure wherein the two opposing support surfaces have a perforated central portion that permits fluid passage between the two support surfaces. A flat surface surrounds each perforated central portion. The filter unit is formed by sealing a filter and a cover to each flat portion of the filter support and the cover is spaced apart from the support to permit fluid passage through the filter. A conduit extends through the peripheral surface of the support and provides means for removing liquid from the interior filter support. An inlet means is attached to the peripheral surface of the filter holder in sealed relationship to permit passage of liquid to each filter surface. In use, liquid from the inlet is passed through both filters, through both surfaces of the support and through the outlet conduit.

The invention will be more fully described with reference to the accompanying drawings. The drawings show the preferred filter support configuration wherein each opposing surface comprises a set of parallel ribs and parallel fluid passages. It is to be understood that any configuration of perforations in the opposing surfaces of the support that permits fluid passage between the surfaces can be used. Thus, one surface can be a set of concentric ribs while the opposing surface can be a set of radial ribs that are connected to permit fluid passage to the outlet. Alternatively, the opposing surfaces can comprise a set of circular holes in a flat surface; each set being offset from the other so that fluid progresses toward the outlet rather than merely filling the holes and remaining static. Each perforation is not so large as to cause rupturing of the filter membrane during use.

Figure 1:
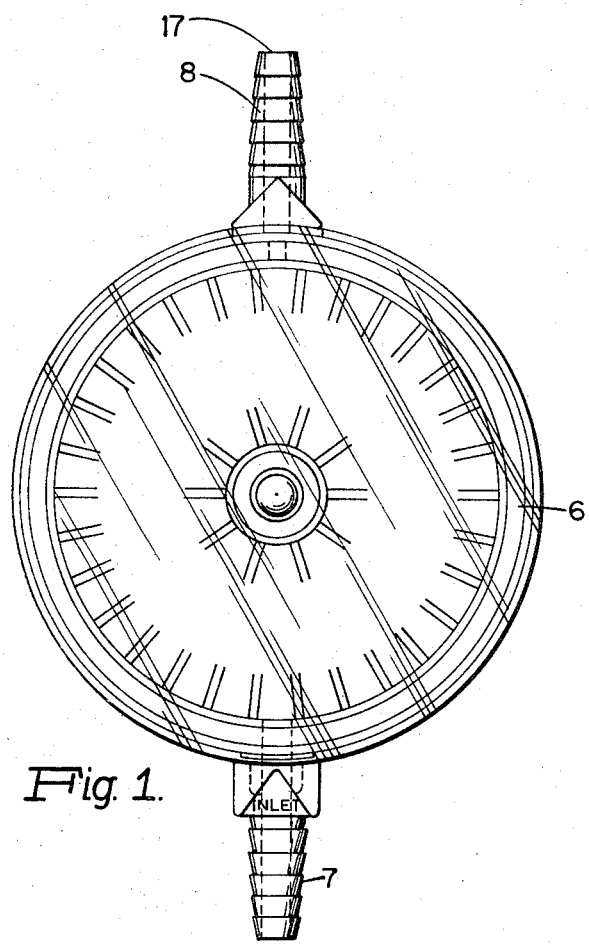
FIG. 1 is a top view of the filter unit of this invention.
Figure 8:
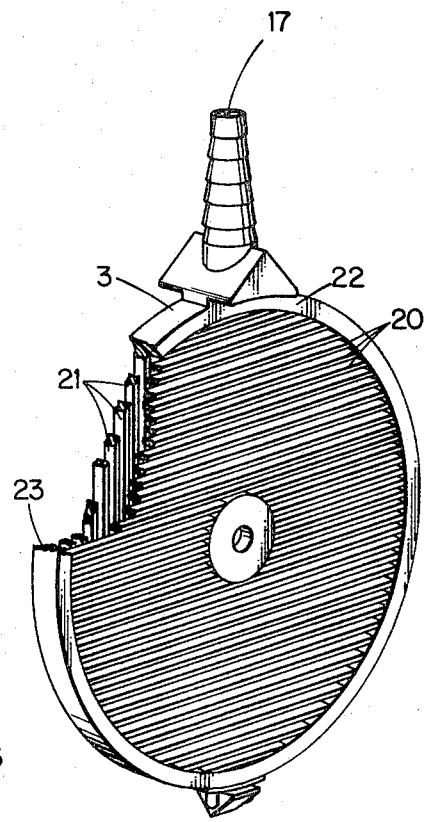
FIG. 8 is an isometric view of a filter support.
Figure 2:
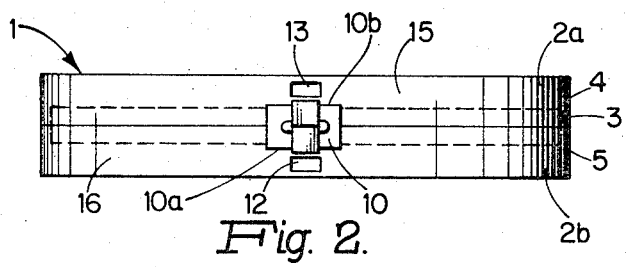
FIG. 2 is a side view of the filter unit of FIG. 1, with the inlet attachment removed.
Figure 3:
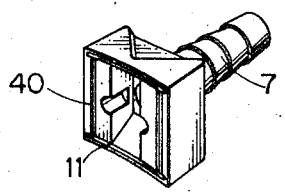
FIG. 3 is an isometric view of the inlet attachment.
Figure 4:
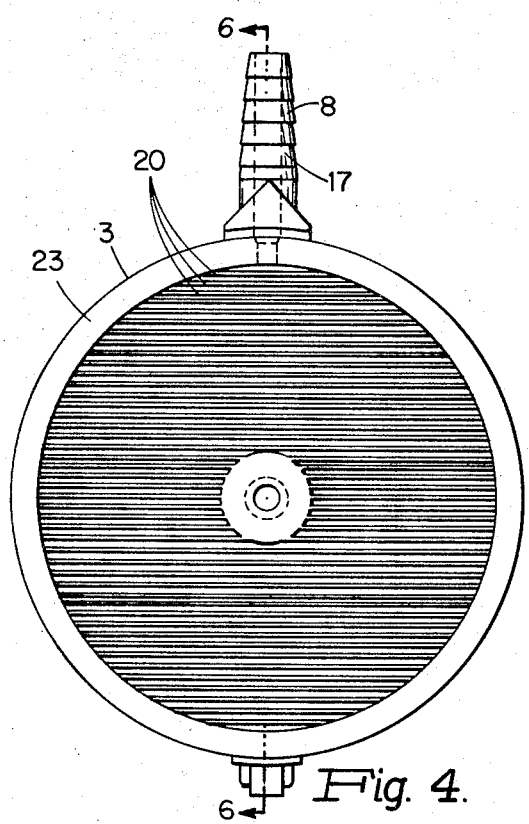
FIG. 4 is a top view of the filter support.
Figure 5:
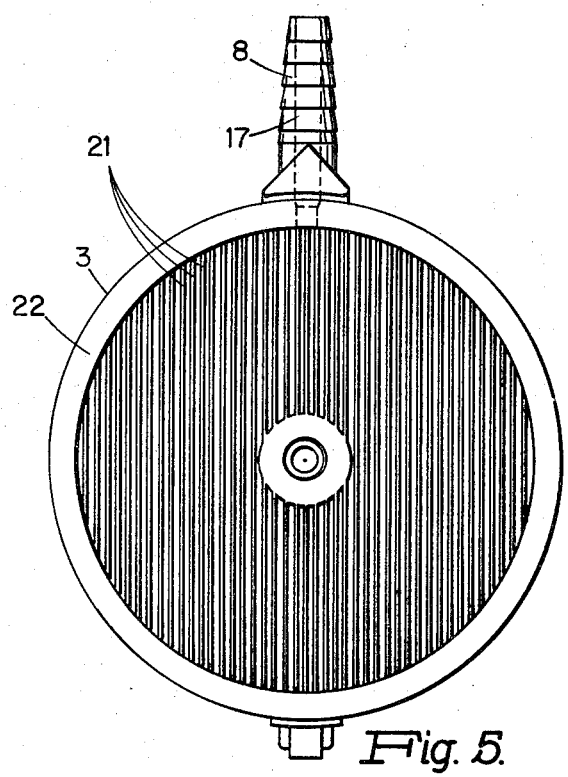
FIG. 5 is a bottom view of the filter support.
Figure 6:
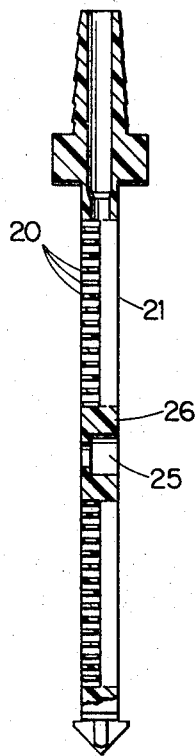
FIG. 6 is a cross sectional view taken along line 6—6 of FIG. 4.

Referring to FIGS. 1 and 2, the filter unit generally designated as 1, comprises two covers 2a and 2b, a filter support 3, a sheet of filter material 4 placed on the one surface of the filter support 3 and a sheet of filter material 5 placed on the opposing surface of the filter support 3. The covers 2a and 2b are sealed to the filter support 3 through the filters 4 and 5 to seal the interior of the filter from the atmosphere and to seal upstream material from downstream material. The seal 6 extends around the entire periphery of the filter unit 1 where each cover is attached to the filter support. A suitable method for sealing is described in U.S. Pat. No. 3,471,019 and, as described therein, a proper seal 6 will cause the unit 1 and filters 4 and 5 to appear transparent. The filter unit 1 has an inlet 7 and an outlet 8. The inlet 7 is attached to the filter support 3 by being placed on fitting 10 which mates with opening 11 of the inlet 7. The fitting 10 is shaped so that liquid entering inlet 7 is split to direct one half through inlet 12 in cover 2b and the other half through inlet 13 in cover 2a. The fitting 10 is not essential to attain the desired stream splitting. Fluid flow to both filters 4 and 5 is attained merely due to the pressure drop through the filters 4 and 5; the fluid being directed to the filter having the least pressure drop and to both when the pressure drop is equalized. The liquid in spaces 15 and 16 is maintained under pressure and is forced through the filters 4 and 5 respectively. The liquid enters the spaces in the filter support 3 and exits from the filter unit through conduit 17 in the outlet 8.

Referring to FIGS. 4, 5, 6 and 8, the filter support 3 comprises two sets of parallel ribs 20 and 21 which are joined together at the intersections of the respective sets of ribs 20 and 21 so that spaces are formed to permit fluid to pass between the grids 20 and 21. The outer surfaces 22 and 23 surrounding both sets of ribs are flat to provide satisfactory sealing of the covers 2a and 2b and the filters 4 and 5. The conduit 17 of outlet 8 extends from the interior of the support 3 and is in communication with the spaces formed by the grids 20 and 21. The hole 25 at the center of the filter support 3 provides a means for fastening the cover, filters and filter support at the center thereof thereby providing a stronger filter unit. A smooth portion 26 around the periphery of the hole 25 is provided so that the covers can be sealed to the filter support through the filter in the manner described above. Alternatively, the central hole can be eliminated.

Figure 7:
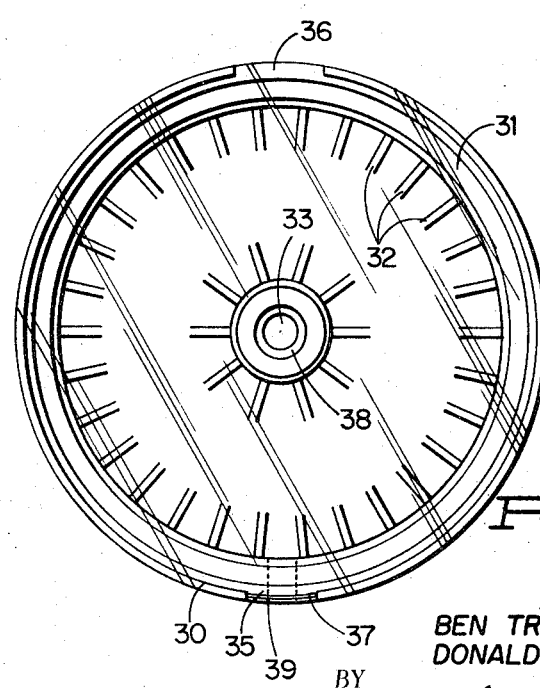
FIG. 7 is a top view of the inside cover surface.

Referring to FIG. 7, the cover comprises a rim 30 an inside shoulder 31 and ribs 32 extending around the periphery thereof. It is also provided with a hole at the center 33 for passing a rivet therethrough. The cover has slots 35 and 36 to accommodate the inlet and outlet sections of the filter support 3. In the slot 35, a relatively small ridge of plastic 37 is provided so that excess plastic is melted during the sealing operation thereby ensuring a perfect seal. This excess plastic is beaded along lines 10a and 10b on the peripheral surface of the filter unit and provides ease of attachment of the inlet means 7 thereto. Sufficient excess plastic is provided in ridge 37 to ensure that after sealing, no surface crack exists between the fitting 10 and the covers 2a and 2b. The excess plastic preferably is beaded on the peripheral surface of the filter unit so that the bead is remelted when the inlet means 7 is attached thereto, thereby preventing leakage between the fitting and the covers and sealing upstream from downstream material. The covers are welded to the filter holder as for example ultrasonically. The inlet conduit 7 then is fitted over the inlet fitting 10 and is ultrasonically welded to the peripheral surface of the filter unit. The inlet is molded with a rim of plastic material 40 that provides excess plastic material melted during the sealing step and ensures a perfect seal with the peripheral surface of the filter unit.

The filter support is molded as one piece, as for example, in the shape shown in FIGS. 4, 5 and 6 or 8. In any event, the parallel rib sections 20 and 21 are joined at an angle, not necessarily perpendicular, and around the periphery of the rib section, on both sides of the support, a relatively flat portion is formed. The hole and relatively flat surfaces surrounding the hole at the center of the filter support are optional and are employed when increased strength of the filter unit is desired. Similarly, the shape of the outlet means need not be as shown in the figures. However, the conduit associated with the outlet extends into the interior of the filter support to provide fluid communication between the outlet conduit and the perforations in both surfaces. In addition, the main fitting for the inlet means need not be as shown in the figures. The flat surfaces 22 and 23 are desirable to provide a perfect seal between the cover, filter holder and filters.

Porous membrane filters are made from a material that appears transparent when there are no holes therein and are placed on both surfaces of the filter support 3. Suitable filters are manufactured by the Millipore Corporation of Bedford, Mass. and sold under the trademark Millipore and can be formed from a mixture of cellulose nitrate and cellulose acetate having a thickness of about 150 microns. The filter can have any desirable average pore size, usually ranging from about 0.2 to 15 microns.

The parts of the filter unit 1 are assembled as follows:

A membrane filter 4 is placed on a cover 2a inside the rim 30. The filter support 3 is placed on the filter and the assembly is welded together. The filter 5 and cover 2b are similarly assembled and welded to the opposite side of the filter support. Inlet 7 then is assembled in fitting 10 and welded in place.

We claim:

1. A filter unit comprising:
   a. a dual filter support comprising a plate-like member having two opposing support surfaces each adapted to support a filter and a peripheral surface connecting said support surfaces, each support surface including a perforated portion and an imperforate portion surrounding said perforated portion, said perforated portions being defined by two sets of ribs, one of said sets overlying the other, the outer surfaces of each set of ribs defining the perforated portion of one of said filter supporting surfaces, the ribs of one set being non-parallel to the ribs of the other set, and ribs of one set being joined to ribs of the other set intermediate said supporting surfaces where said ribs cross, adjacent ribs in each set defining fluid flow passages in the space there-between, and an outlet conduit extending through the peripheral surface of said filter support to permit fluid passage from at least one of said fluid flow passages to the exterior of said filter support;
   b. a porous filter on each support surface; and
   c. a cover means sealed to each flat surface on said filter support to prevent fluid from bypassing the filter and peripheral fluid inlet means (for supplying) constructed and arranged to supply fluid to the spaces defined by each of said cover means and the surface of said filters.

2. The filter unit of claim 1 wherein the ribs in each set of ribs are parallel.

3. The filter unit of claim 2 wherein the sets of ribs are in perpendicular relationship.

* * * * *